United States Patent
Vachhani et al.

(10) Patent No.: US 8,682,324 B2
(45) Date of Patent: Mar. 25, 2014

(54) CELL RESELECTION METHOD AND APPARATUS

(75) Inventors: Ajay Vachhani, Berkshire (GB); Jon Van Orden, Berkshire (GB)

(73) Assignee: NEC Corporation, Tokyo (JP)

(*) Notice: Subject to any disclaimer, the term of this patent is extended or adjusted under 35 U.S.C. 154(b) by 169 days.

(21) Appl. No.: 13/125,053

(22) PCT Filed: Oct. 19, 2009

(86) PCT No.: PCT/JP2009/068291
§ 371 (c)(1),
(2), (4) Date: Jul. 6, 2011

(87) PCT Pub. No.: WO2010/047397
PCT Pub. Date: Apr. 29, 2010

(65) Prior Publication Data
US 2011/0263261 A1 Oct. 27, 2011

(30) Foreign Application Priority Data
Oct. 20, 2008 (GB) .................................. 0819155.3

(51) Int. Cl.
*H04W 4/00* (2009.01)
*H04W 36/00* (2009.01)
*H04W 40/00* (2009.01)

(52) U.S. Cl.
USPC .................... 455/435.2; 455/436; 455/445

(58) Field of Classification Search
USPC .................... 455/435.2, 436, 437, 443, 444
See application file for complete search history.

(56) References Cited

U.S. PATENT DOCUMENTS

| | | | |
|---|---|---|---|
| 5,930,721 A * | 7/1999 | Fried et al. | 455/466 |
| 6,681,112 B1 | 1/2004 | Schwarz et al. | |
| 6,845,238 B1 | 1/2005 | Muller | |
| 2001/0011019 A1 | 8/2001 | Jokimies | |
| 2001/0031638 A1 | 10/2001 | Korpela et al. | |
| 2004/0022217 A1 | 2/2004 | Korpela et al. | |
| 2004/0147263 A1 | 7/2004 | Schwarz et al. | |
| 2004/0202140 A1* | 10/2004 | Kim et al. | 370/335 |
| 2008/0101318 A1 | 5/2008 | Taaghol et al. | |
| 2009/0247161 A1* | 10/2009 | Pani et al. | 455/435.3 |
| 2010/0048209 A1* | 2/2010 | Aoyama et al. | 455/435.2 |

FOREIGN PATENT DOCUMENTS

CN 1764315 4/2006
(Continued)

OTHER PUBLICATIONS

International Search Report, PCT/JP2009/068291, Nov. 17, 2009.
JP Office Action dated Sep. 17, 2013, with English translation; Application No. 2011-516910.
(Continued)

*Primary Examiner* — Wesley Kim
(74) *Attorney, Agent, or Firm* — Young & Thompson

(57) ABSTRACT

A mobile radio communications device is used for use in a cellular network and arranged for reselection to a neighbouring cell as required, the device being a arranged to employ one of a plurality of measurement qualities as part of a cell-reselection procedure, wherein the measurement quantity employed is selected responsive to a characteristic of the neighbouring cell, such that the device can employ different measurement quantities for different neighbouring cells, and to a related method of operation, network device and signalling message structure.

18 Claims, 4 Drawing Sheets

| | | | |
|---|---|---|---|
| 76 → Cell selection and reselection quality measure for Intra Frequency Cells | MP | Enumerated (CPICH Ec/N0, CPICH RSCP) | Choice of measurement (CPICH Ec/N0 or CPICH RSCP) to use as quality measure Q. |
| 78 → Cell selection and reselection quality measure for Inter Frequency Cells | MP | Enumerated (CPICH Ec/N0, CPICH RSCP) | Choice of measurement (CPICH Ec/N0 or CPICH RSCP) to use as quality measure Q. |

(56) References Cited

FOREIGN PATENT DOCUMENTS

| | | |
|---|---|---|
| CN | 101064899 | 10/2007 |
| JP | 10-257549 | 9/1998 |
| JP | 2002-369236 | 12/2002 |
| JP | 2003-509982 | 3/2003 |
| JP | 2003-534675 | 11/2003 |
| JP | 2005-524360 | 8/2005 |
| JP | 2006-94383 | 4/2006 |
| JP | 2009-260448 | 11/2009 |

OTHER PUBLICATIONS

NTT DoCoMo, Expansion of CPICH RSCP range, 3GPP TSG-RAN WG2 Meeting #33, R2-022888, Nov. 15, 2002.

Motorola, Neighbour List Parameters, 3GPP TSG-RAN WG2 Meeting #61bis, R2-081802, Apr. 4, 2008.

The First Office Action issued Apr. 22, 2013 by the State Intellectual Property Office of the People's Republic of China in counterpart Chinese Patent Application No. 200980141728.3 with full English translation.

* cited by examiner

Fig.4

| Cell selection and reselection quality measure | MP | | Enumerated (CPICH Ec/N0, CPICH RSCP) | Choice of measurement (CPICH Ec/N0 or CPICH RSCP) to use as quality measure Q.<br><br>NOTE: For TDD, each choice of this parameter represents PCCPCH RSCP |

| Cell selection and reselection quality measure for Intra Frequency Cells | MP | | Enumerated (CPICH Ec/N0, CPICH RSCP) | Choice of measurement (CPICH Ec/N0 or CPICH RSCP) to use as quality measure Q. |
| Cell selection and reselection quality measure for Inter Frequency Cells | MP | | Enumerated (CPICH Ec/N0, CPICH RSCP) | Choice of measurement (CPICH Ec/N0 or CPICH RSCP) to use as quality measure Q. |

76 →
78 →

US 8,682,324 B2

CELL RESELECTION METHOD AND APPARATUS

TECHNICAL FIELD

The present invention relates to cellular communication networks and to procedures and related devices for achieving cell reselection. In particular, but not exclusively, the invention relates to possible reselection to a Femtocell.

BACKGROUND ART

Cell Reselection for a mobile radio communications device User equipment (UE) operating within a cellular network comprises an important capability offering many advantages to both the user, and the network operator, and having regard in particular to load-management and continuity of service.

It can therefore been seen as important to achieve efficient, reliable and accurate cell reselection as and when candidate neighbouring cells are available.

Current reselection procedures involve measurement techniques that employ a measurement quantity but which exhibit disadvantages which serve to limit, and possibly prevent, reselection to the most appropriate neighbouring cell.

A requirement for accurate and efficient reselection procedures becomes particularly acute when a candidate neighbouring cell for reselection comprises a Femtocell.

As will be appreciated, Femtocells are defined by low-power, small local base stations, and generally employed to provide local radio coverage within, for example, a residential environment, a dead zone such as where no macro cell coverage is available, WiFi-type hot spots and also small-to-medium enterprise environments.

For example, insofar as 3G Macro Cells operate on high frequencies in the range of 2 GHz-3 GHz, it is appreciated that they offer poor coverage/signal strength within buildings. Poor wall penetration, and the higher absorption characteristics, at such higher frequencies limit performance in this manner. Such poor "in-building" performance leads to small area within marco cell coverage where limited, or indeed no-coverage, is available.

The provision of Femtocells can therefore prove advantageous in effectively filling-in the gaps that such in-building environments can define within the macro cell environment.

A further advantage that arises from employing Femtocells is that they can assist the overall performance within the macro cell environment by effectively reducing the load on the macro cell infrastructure. Thus the use of Femtocells provides a mechanism for dealing with poor coverage issues, whilst also offering potential benefits such as increased capacity on the macro cell, and for the ready commercial provision of bundled services, such as: DSL Broadband and Mobile Phone services.

Femtocells also appear attractive to an end user in so far as much more cost effective mobile voice and data calls can be made, while also experiencing improved domestic coverage.

Reselection to a Femtocell for example in poor coverage environments is therefore an attractive proposition, and so such cells will then compete with other neighbouring cells, both Femto or Macro, during such reselection procedures.

With regard to deployment, it will be appreciated that such Femtocells can be operated with various different operational characteristics, for example, whether on the same, or different, carrier frequency as the neighbouring macro cell(s).

DISCLOSURE OF INVENTION

An exemplary object of the invention is to provide for a reselection procedure and related apparatus having the advantages over known such reselection procedures and apparatus.

According to a first aspect of the present invention, there is provided a mobile radio communications device for use in a cellular network and arranged for reselection to a neighbouring cell as required, the device being a arranged to employ one of a plurality of measurement qualities as part of a cell-reselection procedure, wherein the measurement quantity employed is selected responsive to a characteristic of the said neighbouring cell, such that the device can employ different measurement quantities for different neighbouring cells.

According to another aspect of the present invention, there is provided a cell-reselection method for use in a cellular network and including the step of initiating one of a plurality of measurement quantities for controlling reselection to a neighbouring cell, the measurement quantity employed being selected responsive to a characteristic of the said neighbouring cell so as to allow for the use of different measurement quantities for different neighbouring cells.

According to still another aspect of the present invention, there is provided a cellular communications network device arranged for communication within a mobile radio communications device within the network and for reselection of the mobile radio communication device to a neighbouring cell as required, the network device being arranged to provide control signalling to the mobile radio communications device to determine which of a plurality of measurement quantities is employed as part of a cell reselection procedure and having regard to a characteristic of the said neighbouring cell such that the mobile radio communications device can employ different measurement quantities for different neighbouring cells.

The present invention can also provide for a signalling message for cell reselection of a mobile radio communications device to a neighbouring cell in a cellular network, the message being arranged for delivery to the mobile radio communications device to initiate use of a measurement quantity as part of the reselection procedure having regard to a characteristic of the said neighbouring cell, wherein the signalling message includes separate discrete portions for each different characteristic.

BRIEF DESCRIPTION OF DRAWINGS

FIG. 4 is an illustration of an information element within signalling messaging according to the current art;

FIG. 5 is an illustration of similar signalling but arising in accordance with an embodiment of the present invention.

BEST MODE FOR CARRYING OUT THE INVENTION

Figure 1:
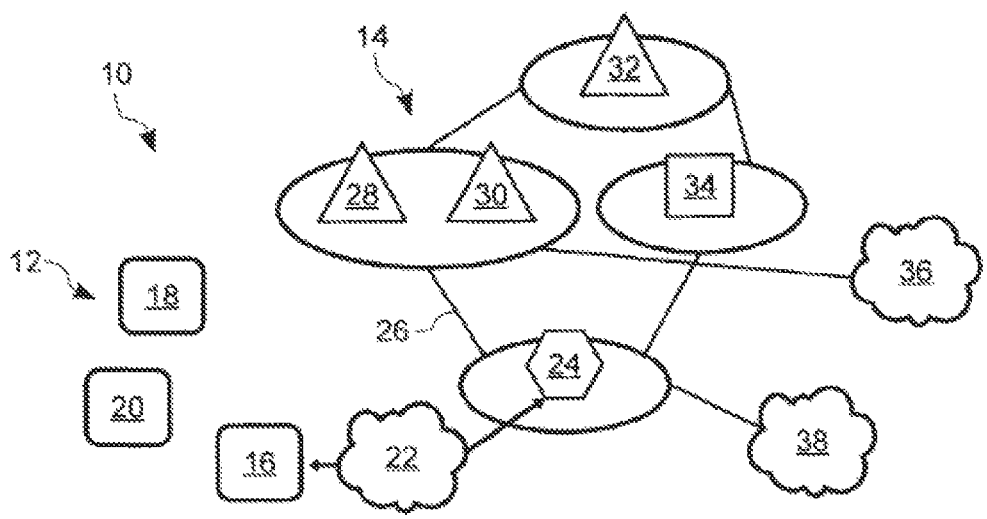
FIG. 1 is a schematic representation of Femtocell architecture for use in accordance with the present invention.

As will be appreciated, the following discussion of an embodiment of the present invention relates particularly to the possibility for cell reselection from a 3G macrocell to Femtocell. However it should be appreciated that the present invention is in now way restricted to such reselection procedures.

As further background information relating to invention however, when the operational characteristic of cell for reselection purposes comprises, for example, frequency and the UE is within a macrocell, it is generally arranged to perform a neighbouring-cell measurement when the current serving macrocell degrades in quality. Neighbouring cells can be operating on the same, or different, frequency as that of the serving macrocell.

There are generally two types of measurement quantities which the UE can employ and each of which is generally initiated by the network and generally required by the network to measure either one of them.

The first measurement quantity is the Received Signal Code Power—RSCP.

The second can comprise the ratio EC/No.

The ratio Ec/No is derived from the value for the Received Signal Strength Indicator (RSSI) and which is defined as the received wide band power including thermal noise and noise generated within the receiver and within the bandwidth defined by the receiver.

As will be appreciated, the value RSCP comprises the received power on a particular code (i.e. scrambling code) and as measured on the primary CPICH of the cell.

The ratio Ec/No can therefore be defined as RSCP/carrier RSSI.

As previously noted, the UE is required to measure the requested measurement quantity which will either comprise the RSCP or the ratio Ec/No for all neighbouring cells in respect of which selection might be attempted.

As is currently known the network/cell cannot request that the UE perform measurements based on different measurement quantities for cells having different characteristics. That is, the network/cell, simply requests the UE to perform one measurement quantity such as Ec/No for intra-frequency cells (i.e. between cells operating on the same frequency) and another quantity, for example, RSCP, for inter-frequency cell measurements (i.e. for cells operating in accordance with different frequencies).

It will be appreciated that such known current operation is disadvantageously limiting since only one measurement quantity will be employed and, in some instances, the said one measurement quantity chosen will not be the most appropriate choice. A potentially attractive/advantageous cell-reselection procedure might not therefore be identified.

This is explained further below.

If, for example, a Femtocell is operating on the same frequency as a macrocell, then it is far easier and feasible for a UE to consider the Femtocell as a candidate cell for reselection. It will be appreciated that it is readily possible to trigger a desirable cell reselection procedure irrespective of whether the measurement quantity employed is RSCP of Ec/No. That is, as the UE enters within the walls of a building, there will be a noted reduction of RSCP in view of the high absorptions for the macro cell signal such that, by comparison, the Femtocell will become readily identifiable as a good candidate for cell reselection.

Insofar as the Femtocell and the serving macro cell are both operating on the same frequency, the respective RSSI values will remain high due to the interference offered by the Femtocell operating on that same frequency as the macro cell such that, if a measurement quantity is the ratio Ec/No, this likewise is reduced for the macro cell since the RSSI value holds up, while the RSCP value decreases.

Thus, the attractive Femtocell can be readily discernable as compared with the macro cell irrespective of whether the measurement quantity comprises RSCP or the ratio Ec/No.

If, however, the Femtocell is arranged to operate on a different carrier frequency from that of the macro cell, the accuracy of cell reselection differs markedly from the scenario noted above.

If the measurement quantity comprises RSCP, it will still be readily recognised that the signal strength from the macro cell has deteriorated such that the Femtocell is readily unidentifiable as an attractive candidate cell for reselection purposes.

However, if the measurement of quantity employed is Ec/No, it becomes difficult for the UE to trigger a cell reselection procedure to the Femtocell because no difference between the macro cell and Femtocell can be readily identified.

While the value of RSCP deteriorates, it will be appreciated that, in view of the different operational frequencies, the value of RSSI for the serving macro cell likewise deteriorates (since it is not enhanced by the Femtocell since this is not operating in the same frequency) such that the general ratio Ec/No remains substantially the same and so the macro cell remains as potentially attractive as the Femtocell.

Thus, whilst for all the advantages discussed above, reselection to the Femtocell will be desirable, this will not necessarily be achieved through use of Ec/No as the measurement quantity.

As would be appreciated, and with regard to the particular illustrated embodiment of the present invention, this embodiment advantageously proposes use of different measurement quantities for intra and inter frequency neighbouring-cell measurements by the UE and so as to increase the extent to which reselection from a macro cell to a Femtocell can be achieved in a trouble-free manner.

Turning now to FIG. 1 there is illustrated a general Femtocell architecture 10 in which a Femtocell 12 is provided for operation in accordance with an operator's core network 14.

The Femptocell employs a wireless access point 16 allowing for connectivity to, in this illustrated embodiment, wireless connectivity to, this embodiment a laptop device 18 and a UE comprising a mobile phone handset 20.

A standard 3GPP broadband interface 22 is provided for connectivity to a Femtocell gateway 24 which likewise, via a 3GPP standard interface 26, provides connectivity to an MSS circuit switched call 28 and a GSN packet call 30.

As illustrated, further connection is made within the call network to VAS 32, home location register/home subscriber server 34, PSTN 36, and mobile phone PDN 38.

Figure 2:
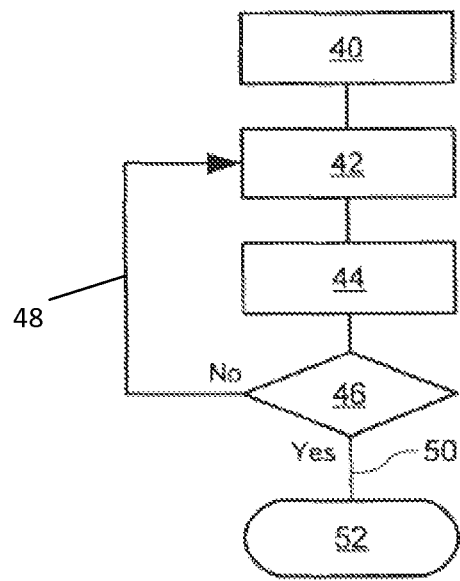
FIG. 2 is a flow diagram relating to a cell reselection procedure as known in the current art.

Turning now to FIG. 2, there is provided a flow diagram illustrating the cell reselection procedure in accordance with the current art.

The procedure commences at step 40 where the desired measurement quantity is selected as specified within the system information.

A particular neighbouring cell is chosen at 42 and a measurement quantity applied at step 44. It is then determined at step 46 as to whether or not the cell chosen was the last in the list of neighbouring cells and, if not, the procedure returns via 48 to pick the next neighbouring cell against at step 42.

If, however, at step 46 it was determined that the last of the possible neighbouring cells had been measured, then the procedure continues via 50 to its conclusion at step 52.

The measurement quantity is therefore applied generally to all neighbouring cells irrespective of whether or not such measurement quantity might indeed be the most appropriate for each cell characteristic.

Figure 3:
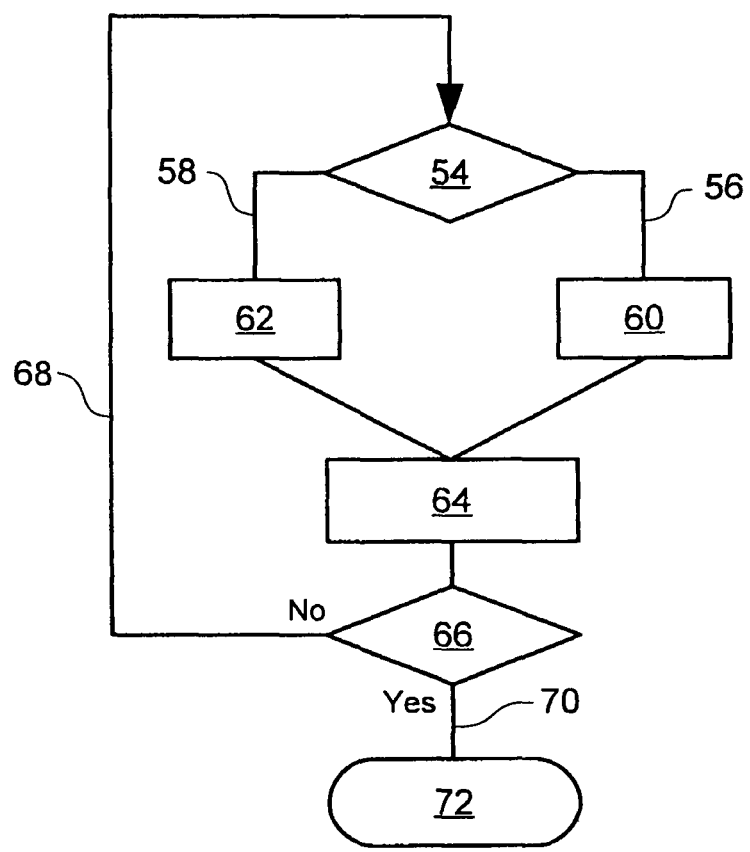
FIG. 3 is a flow diagram relating to the cell reselection procedure according to an embodiment of the present invention.

Turning now however to FIG. 3 there is provided a flow diagram relating to an embodiment of the present invention.

Here, determination is illustrated at step 54 as to the type of cell, i.e. the characteristic of the cell concerned, that is whether, for example, the cell might be operating on the same frequency as the current serving macro cell or not.

If, at step 54 it is determined that the cell is operating on the same frequency, then the procedure continues via 58 to step 62 where the appropriate measurement quantity specified for intra frequency cell measurements as chosen and subsequently applied at step 64.

As with the procedure in FIG. 2, it is then determined whether or not any further neighbouring cells are available for measurement, and, if they are, the procedure returns via 64 to step 54 where the type of cell is again determined.

If, however, initially at step 54 it is determined that the respective frequencies are different, then the procedure continues via 56 to step 60 where a measurement quantity specified for inter frequency cell measurement is chosen and subsequently applied at step 64.

Again, at step 60 it is determined whether or not a remaining cell exists in the neighbouring cell, and, if so, the procedure returns again via 68 to step 54.

If, however, for both measurements are estimated above, it is determined at step 66 that no further cell remained for measurement, then the procedure continues via 70 to its completion at step 72.

Thus, in this embodiment, and through the determination of the nature of the candidate cell for each selection, the actual measurement employed within the UE can be readily determined responsive to the cell-characteristic identification and so as to readily identification of a suitable candidate Femtocell in a far more responsive, and efficient, manner and can be achieved in accordance with the current art.

Relevance is now made to FIG. 4 which is an illustration of an information element as currently employed within the signalling of the current art.

This information element 74 comprises a composite element which is employed, somewhat disadvantageously as noted in relation to FIG. 2 irrespective of the cell characteristic and the most relevant measurement quantity that might be available.

Turning now by way of comparison to FIG. 5, there is provided similar illustration of an information element arising in accordance with the signalling of the present invention.

Here, it would be appreciated that the information element has been divided into two separate parts 76, 78 which are arranged so as to have regard to each respective cell characteristic and relevant measurement quantity.

The control information can advantageously be employed with the relevant signalling so as to initiate an appropriate measurement and cell reselection procedure within the UE.

Figure 6:
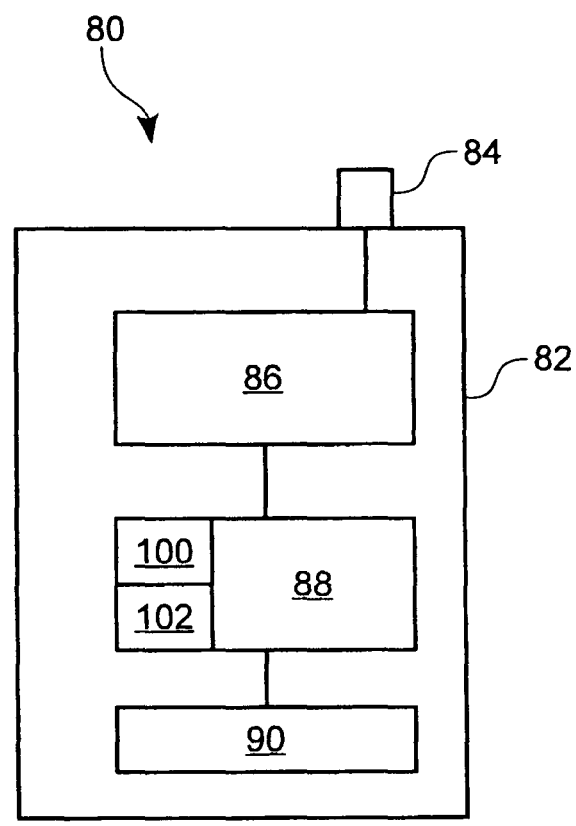
FIG. 6 is a schematic representation of a mobile radio communications device arranged for operation in accordance with an embodiment of the present invention.

Turning lastly to FIG. 6, there is provided a schematic illustration of a UE 80 arranged for operation in accordance with the present invention.

The UE 80 comprises standard casing 82 and antenna 84 which is connected to receive/transmit 86 which likewise is operatively connected to the processor at 88, and memory 90 functionality within the handset.

The processor 88 is provided with respective further functionality 100, 102 each of which provides for cell-selection measurements according to respective measurement quantities, each of which can be chosen and deployed in accordance with cell characteristics as determined for each candidate cell for reselection and in accordance with the procedures discussed above.

As will be appreciated, the present invention is advantageous insofar as it can offer a variety of operational characteristics.

These include, bur are not limited to specifying different measurement quantities for different types of neighbour cells, such as Intra and Inter Frequency Cells.

Using the above modification, Radio Networks can specify two Measurement Quantities for Neighbour Cells.

Radio Networks can associate each Measurement Quantity with one of the following types of cells, Intra Frequency and Inter Frequency.

From the above information, mobile Phone determines independently which measurement quantity to apply to which cell in the Neighbour Cell List, based on the cell type.

Mobile Phone applies one Measurement Quantity per cell, but could apply two different measurement quantities to a set of Neighbour Cells.

Also a change to the UE/Mobile-Phone Call Reselection procedures can be readily achieved to apply two different measurement quantities for, i.e. one for Intra Frequency Cells and another for Inter Frequency Neighbour Cells.

According to a first aspect of the present invention, there is provided a mobile radio communications device for use in a cellular network and arranged for reselection to a neighbouring cell as required, the device being a arranged to employ one of a plurality of measurement qualities as part of a cell-reselection procedure, wherein the measurement quantity employed is selected responsive to a characteristic of the said neighbouring cell, such that the device can employ different measurement quantities for different neighbouring cells.

As will be appreciated, the present invention is advantages insofar as the reselection procedure is not now limited to a single measurement quantity. On this basis a more accurate, reliable and efficient reselection procedure can be conducted and which advantageously increases the likelihood of selecting to a desirable cell, whether a Femtocell or otherwise.

Advantageously the device can be arranged for reselection to a neighbouring cell comprising a Femtocell.

The measurement quantity can comprise the received signal power code.

In addition, the aforesaid measurement quantity can comprise the Ec/No ratio. Further, the said characteristic can comprise frequency of operation and, in particular, whether or not the neighbouring cell is operating on the same frequency as the current cell.

Further, the device can be arranged such that the said one of a plurality of measurement quantities is employed subsequent to receipt of respective signal for each respective characteristic. Advantageously, the said signalling can comprise an information block or information element.

According to another aspect of the present invention, there is provided a cell-reselection method for use in a cellular network and including the step of initiating one of a plurality of measurement quantities for controlling reselection to a neighbouring cell, the measurement quantity employed being selected responsive to a characteristic of the said neighbouring cell so as to allow for the use of different measurement quantities for different neighbouring cells.

As before, the device can be arranged for reselection to a neighbouring cell comprising a Femtocell.

The measurement quantity can again comprise the received signal power code.

Also, the aforesaid measurement quantity can comprise the Ec/No ratio. Further, the said characteristic can comprise frequency of operation and, in particular, whether or not the neighbouring cell is operating on the same frequency as the current cell.

The device can also be arranged such that the said one of a plurality of measurement quantities is employed subsequent to receipt of respective signal for each respective characteristic.

Advantageously, the said signalling can comprise an information block or information element.

According to still another aspect of the present invention, there is provided a cellular communications network device arranged for communication within a mobile radio communications device within the network and for reselection of the mobile radio communication device to a neighbouring cell as required, the network device being arranged to provide control signalling to the mobile radio communications device to determine which of a plurality of measurement quantities is employed as part of a cell reselection procedure and having regard to a characteristic of the said neighbouring cell such that the mobile radio communications device can employ different measurement quantities for different neighbouring cells.

Advantageously the device can be arranged for reselection to a neighbouring cell comprising a Femtocell.

The measurement quantity can comprise the received signal power code.

In addition, the aforesaid measurement quantity can comprise the Ec/No ratio. Further, the said characteristic can comprise frequency of operation and, in particular, whether or not the neighbouring cell is operating on the same frequency as the current cell.

Further, the device can be arranged such that the said one of a plurality of measurement quantities is employed subsequent to receipt of respective signal for each respective characteristic.

As noted, the said signalling can comprise an information block or an information element.

The present invention can also provide for a signalling message for cell reselection of a mobile radio communications device to a neighbouring cell in a cellular network, the message being arranged for delivery to the mobile radio communications device to initiate use of a measurement quantity as part of the reselection procedure having regard to a characteristic of the said neighbouring cell, wherein the signalling message includes separate discrete portions for each different characteristic.

As will be appreciated, the signalling message can comprise an information block or an information element.

I should be appreciated that the present invention is applicable for all 3G access point configurations, as such as home gateway solution for such a Femtocell for such home NOodeB/ENodeB.

While the invention has been particularly shown and described with reference to an exemplary embodiment thereof, the invention is not limited to this embodiment. It will be understood by those of ordinary skill in the art that various changes in form and details may be made therein without departing from the spirit and scope of the present invention as defined by the claims.

This application is based upon and claims the benefit of priority from UK Patent Application No. 0819155.3 filed on Oct. 20, 2008, the content of which is incorporated by reference.

The invention claimed is:

1. A mobile radio communications device for use in a cellular network and that reselects from a macro cell which is currently selected to a Femtocell for reselection, the device comprising:

a receiving and transmitting device configured to receive signals from and transmit signals to the macro cell and the Femtocell that is a candidate for reselection; and a processor configured to determine whether or not an operational frequency of the macro cell is the same as an operational frequency of the Femtocell that is a candidate for reselection, to determine the Femtocell for reselection, wherein when the operational frequency of the macro cell and the operational frequency of the Femtocell are the same, the processor uses a measurement quantity corresponding to any one of a plurality of measurement qualities, and when the operational frequency of the macro cell and the operational frequency of the Femtocell are different from each other, the processor uses a measurement quantity corresponding to a predetermined measurement quality from the plurality of measurement quantities.

2. The mobile radio communications device as claimed in claim 1, wherein the measurement quantity comprises a received signal power code.

3. The mobile radio communications device as claimed in claim 1, wherein the measurement quantity comprises a carrier-to-noise (Ec/No) ratio.

4. The mobile radio communications device as claimed in claim 1, wherein one of a plurality of measurement quantities corresponding to the plurality of measurement qualities is employed subsequent to receipt of a respective signal for each respective characteristic of the macro cell and the Femtocell that is a candidate for reselection.

5. The mobile radio communications device as claimed in claim 4, wherein signaling, which is performed via the cellular network, comprises an information block or an information element.

6. The mobile radio communications device as claimed in claim 1, wherein the plurality of measurement qualities comprise a carrier-to-noise (Ec/No) ratio and a Received Signal Code Power (RSCP) based on a Common Pilot Channel CPICH), and the predetermined measurement quality is the Received Signal Code Power.

7. A cell-reselection method for use in a cellular network and for reselecting from a macro cell which is currently selected to a Femtocell for reselection, the method comprising: determining whether or not an operational frequency of the macro cell is the same as an operational frequency of the Femtocell which is a candidate for reselection; and using a measurement quantity corresponding to any one measurement quality from a plurality of measurement qualities when the operational frequency of the macro cell and the operational frequency of the Femtocell are the same and, using a measurement quantity corresponding to a predetermined measurement quality from the plurality of measurement quantities when the operational frequency of the macro cell and the operational frequency of the Femtocell are different from each other, in order to determine the Femtocell for reselection.

8. The method as claimed in claim 7, wherein the measurement quantity comprises a received signal power code.

9. The method as claimed in claim 7, wherein the measurement quantity comprises a carrier-to-noise (Ec/No) ratio.

10. The method as claimed in claim 7, wherein one of a plurality of measurement quantities corresponding to the plurality of measurement qualities is employed subsequent to receipt of a respective signal for each respective characteristic of the macro cell and the Femtocell that is a candidate for reselection.

11. The method as claimed in claim 10, wherein signaling, which is performed via the cellular network, comprises an information block or an information element.

12. The method as claimed in claim 7, wherein the plurality of measurement qualities comprise a carrier-to-noise (Ec/No) ratio and a Received Signal Code Power (RSCP) based on a Common Pilot Channel (CPICH), and
the predetermined measurement quality is the Received Signal Code Power.

13. A cellular communications network device arranged for communication within a mobile radio communications device within a cellular network and for reselection of the mobile radio communication device to reselect from a macro cell which is currently selected to a Femtocell for reselection, the cellular communication network device comprising: one or more processors configured to provide control signaling to the mobile radio communications device to determine whether or not an operational frequency of the macro cell is the same as an operational frequency of the Femtocell that is a candidate for reselection, and configured to use a measurement quantity corresponding to any one of a plurality of measurement qualities when the operational frequency of the macro cell and the operational frequency of the Femtocell are the same, and use a measurement quantity corresponding to a predetermined measurement quality from the plurality of measurement qualities when the operational frequency of the macro cell and the operational frequency of the Femtocell are different from each other, in order to determine the Femtocell for reselection.

14. The cellular communications network device as claimed in claim 13, wherein the measurement quantity comprises a received signal power code.

15. The cellular communications network device as claimed in claim 13, wherein the measurement quantity comprises a carrier-to-noise (Ec/No) ratio.

16. The cellular communications network device as claimed in claim 13, wherein one of a plurality of measurement quantities corresponding to the plurality of measurement qualities is employed subsequent to receipt of a respective signal for each respective characteristic of the macro cell and the Femtocell that is a candidate for reselection.

17. The cellular communications network device as claimed in claim 16, whereine said control signaling comprises an information block or an information element.

18. The cellular communications network device as claimed in claim 13, wherein the plurality of measurement qualities comprise a carrier-to-noise (Ec/No) ratio and a Received Signal Code Power (RSCP) based on a Common Pilot Channel (CPICH), and
the predetermined measurement quality is the Received Signal Code Power.

* * * * *

UNITED STATES PATENT AND TRADEMARK OFFICE
CERTIFICATE OF CORRECTION

PATENT NO. : 8,682,324 B2  Page 1 of 1
APPLICATION NO. : 13/125053
DATED : March 25, 2014
INVENTOR(S) : Vachhani et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 247 days.

Signed and Sealed this

Twenty-ninth Day of September, 2015

Michelle K. Lee
*Director of the United States Patent and Trademark Office*